Aug. 12, 1947.　　　O. S. SEVERSON　　　2,425,492
FISHING REEL
Filed Dec. 7, 1945　　　2 Sheets-Sheet 1
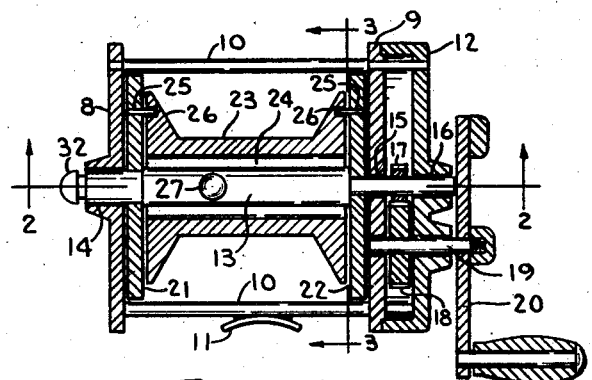
FIG. 1
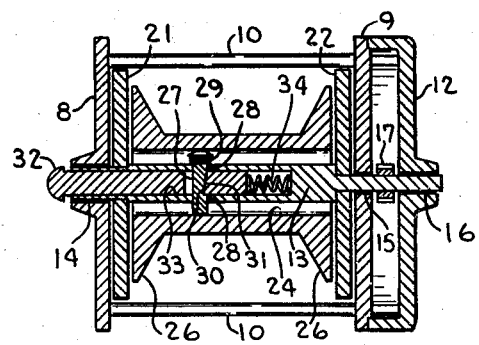
FIG. 2
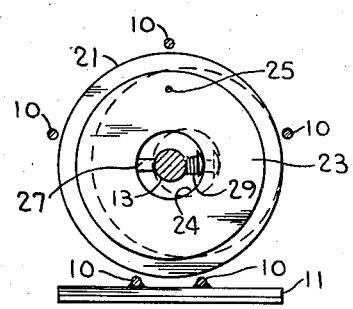
FIG. 3
FIG. 4
INVENTOR.
Oscar S. Severson
BY
Louis O. French
ATTORNEY Patented Aug. 12, 1947

2,425,492

UNITED STATES PATENT OFFICE 2,425,492

FISHING REEL

Oscar S. Severson, Milwaukee, Wis.

Application December 7, 1945, Serial No. 633,363

7 Claims. (Cl. 242—84.1)

1

The invention relates to fishing tackle and more particularly to a fishing reel.

Some fishermen believe that a fishing lure or bait is made more attractive to fish if while the lure is in the water, it is given a series of short jerks as it is reeled in, and this action is accomplished by the fisherman giving a series of short swings to the pole as the lure is reeled in. However, this method of fishing requires considerable skill in the manipulation of the rod, and the object of this invention is to provide a fishing reel which through its action under the control of the operator will produce a reeling in of the line at a non-uniform rate and thus cause a series of spasmodic jerks to be imparted to the lure. More particularly, according to this invention, the spool of the reel is arranged to rotate concentric with the axis of the reel for ordinary reeling operations and to rotate eccentric to said axis for the jerky reeling in operation, the arrangement preferably being such that when a fish strikes the lure, the pull on the line will move the reel from its eccentric to its concentric position.

The invention further consists in the several features hereinafter set forth and more particularly defined by claims at the conclusion hereof.

In the drawings:

Fig. 1 is a vertical sectional view through a fishing reel embodying the invention;

Fig. 2 is a horizontal sectional view taken on the line 2—2 of Fig. 1;

Fig. 3 is a vertical sectional view taken on the line 3—3 of Fig. 1;

Fig. 4 is an elevation view showing certain modifications;

Figure 5:
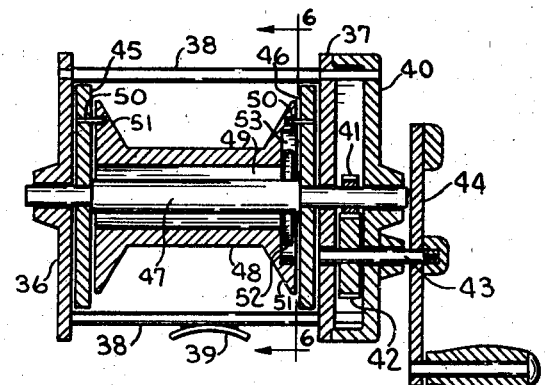
Fig. 5 is a view similar to Fig. 1 showing certain modifications.

Referring to Figs. 1 to 3, the reel includes the usual frame formed by end plates 8 and 9 secured together by tie bars 10, the lower bars having the base plate 11 brazed or otherwise suitably secured thereto. Where the reel is a multiplying reel, a cover plate 12 is secured to the plate 9.

A shaft 13 is suitably journalled in bores 14, 15 and 16, respectively, in the plates 8, 9 and cover 12 and carries a gear 17 meshing with a gear 18 on a shaft 19 journalled in the plate 9 and the cover 12 and carrying the hand crank 20.

A spool carrying frame is mounted on the shaft 13 and comprises spaced plates 21 and 22 fixed to said shaft 13 as by a drive or press fit.

A reel spool 23 has a large central bore 24 through which the shaft 13 extends and has a driving connection with said shaft through pins 25 mounted in the plates 21 and 22 and pivotally mounted in the outer parts of the flanges 26 of said spool, so that said spool may be positioned either eccentic or concentric to the axis of the shaft 13.

For positioning the reel spool in its different positions relative to the shaft 13, I have provided a shiftable headed pin or shaft 27 slidably keyed in openings 28 in said shaft and normally urged in one direction by a spring 29 interposed between said shaft 13 and the head of said pin. The pin 27 is provided with a notch 30 adapted to be engaged by a latch projection 31 formed by a control rod 32 slidably mounted in a bore 33 in the shaft 13, said rod being normally urged into latching engagement with said pin 27 by a spring 34 interposed between the end of the bore 33 and the inner end of the rod 32, the rod projecting outwardly beyond the shaft 13 and the fixed frame of the reel. The spring 29 is shown in Figs. 2 and 3 as a coiled spring, but a flat type spring 35 as shown in Fig. 4 may be used in place of the coil spring.

With this construction, when the latch rod 32 is engaged with the notch 30 in the pin 27, said pin projects equally from diametrically opposite points of the shaft 13 and engages the sides of the bore 24 to hold the reel spool in a position concentric to the spool 23 to wind in the line in a normal manner. When, however, the operator presses inwardly on the outer end of the rod 32 against the pressure of the spring 34 and releases said latch rod from engagement with said pin 27, the spring 29 or 35 acts to shift the pin 27 laterally of the shaft 13 and in doing so swing the reel spool to an eccentric position relative to said shaft as shown in Fig. 3, and so positioned, the line, as the shaft 13 is turned, will be wound onto the spool at a non-uniform rate and produce a jerky action on the lure at the outer end of the line. When, however, a fish strikes the lure and thereby puts a considerable pull on the line and overcomes the tension of the spring 29 or 35, the pin 27 is free to be moved laterally to a position where it will be latched by the rod 32, and the line will then be wound up in the usual manner with the reel spool concentric to the shaft 13.

Figure 6:
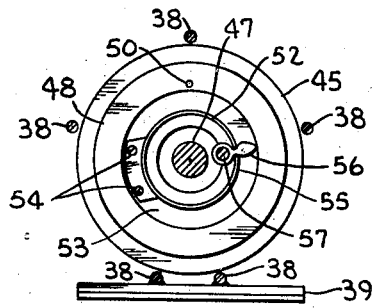
Fig. 6 is a vertical sectional view taken on the line 6—6 of Fig. 5 showing the reel spool in concentric position.
Figure 7:
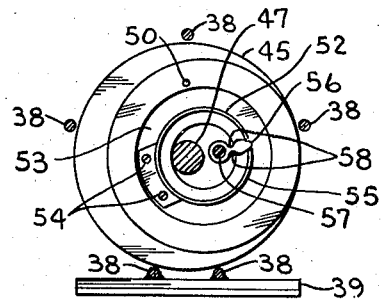
Fig. 7 is a view similar to Fig. 6 showing the reel spool in eccentric position.

In the modification shown in Figs. 5 to 7, inclusive, the reel comprises the parts 36, 37, 38, 39, 40, 41, 42, 43 and 44 which are respectively similar to the parts 8, 9, 10, 11, 12, 17, 18, 19 and 20 previously described. The spool frame plates 45 and 46 are similar to the plates 21 and 22 and have a drive fit on a solid shaft 47 which as described before is journalled in the plates 36, 37 and the cover 40 and carries the gear 41.

The reel spool 48 has a large central bore 49 through which the shaft 47 extends and has a driving connection with said shaft through pins 50 mounted in the plates 45 and 46 and pivotally mounted in the outer parts of the flanges 51 of said spool, so that said spool may be positioned either eccentric or concentric to the axis of the shaft 47.

For positioning the reel spool in its different positions relative to the shaft 47, I have provided a shiftable spring jaw member 52 mounted in a recess 53 in one end of the spool and secured thereto by screws 54 and whose spring jaws 55 are engageable with a latch 56 fixedly secured to the reel plate 46 by a screw 57.

This modified construction operates in the same way as the first described construction to releasably hold the reel spool in its concentric and eccentric positions, it being noted that in the concentric position the spring jaws 55 engage in notches 58 in the latch 56, and that when the operator pushes laterally against the spool, it will be shifted to the eccentric position shown in Fig. 7 where the jaws 55 engage the outer end of said latch 56, and that the pull on the line occasioned by the strike of a fish will act on the reel spool to shift it back to its concentric position shown in Fig. 6.

I desire it to be understood that this invention is not to be limited to any particular form or arrangement of parts except in so far as such limitations are included in the claims.

What I claim as my invention is:

1. In a fishing reel, the combination with a spool drive shaft, of a reel spool, means for mounting said reel spool for drive from said shaft and for positioning said spool concentric and eccentric thereto, and means for releasably holding said reel spool in its concentric and eccentric positions relative to said shaft.

2. In a fishing reel, the combination with a spool drive shaft, of a reel spool carried by said drive shaft and swingable to concentric and eccentric positions relative thereto, and means under the control of the operator for releasably holding said reel spool in its eccentric position.

3. In a fishing reel, the combination with a spool drive shaft, of a reel spool carried by said drive shaft and swingable to concentric and eccentric positions relative thereto, and means under the control of the operator for releasably holding said reel spool in its eccentric position and operable by a fish to move said spool to a concentric position.

4. In a fishing reel, the combination with a spool drive shaft, of a reel spool carried by said shaft and swingable to concentric and eccentric positions relative thereto, and means for releasably holding said reel spool in its concentric position.

5. In a fishing reel, the combination with a spool drive shaft, of a reel spool, means for mounting said reel spool for drive from said shaft and for positioning said spool concentric and eccentric thereto, a shiftable spring pressed pin engageable with said spool to move it to an eccentric position, and an operator controlled spring pressed latch to hold said pin in a position in which said spool is concentric with said shaft.

6. In a fishing reel, the combination with a spool drive shaft, of a reel spool, means for mounting said reel spool for drive from said shaft and for positioning said spool concentric and eccentric thereto, of a spring catch member carried by said spool, and a latch associated with said shaft and releasably engageable with said catch member to hold said spool in its concentric and eccentric positions.

7. In a fishing reel, the combination with a fixed frame, a spool drive shaft journalled in said frame, spaced members mounted on said drive shaft, a flanged reel spool having the outer portions of its flanges pivotally connected to said spaced members and having a central bore through which said shaft extends and permitting shifting of said reel spool to concentric and eccentric positions relative to said shaft, and means for releasably holding said reel spool in its concentric and eccentric positions.

OSCAR S. SEVERSON.

REFERENCES CITED

The following references are of record in the file of this patent:

UNITED STATES PATENTS

| Number | Name | Date |
|---|---|---|
| 1,434,626 | Parks | Nov. 7, 1922 |